United States Patent
Lee et al.

(10) Patent No.: US 6,463,297 B1
(45) Date of Patent: Oct. 8, 2002

(54) DEVICE AND METHOD FOR AUTOMATICALLY DISCONNECTING A CALL IN A MOBILE RADIO COMMUNICATION TERMINAL

(75) Inventors: Yong-Jin Lee; Sung-Soo Go, both of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/210,220

(22) Filed: Dec. 11, 1998

(30) Foreign Application Priority Data

Dec. 11, 1997 (KR) .............................. 97-67810

(51) Int. Cl.[7] .............................................. H04M 9/08
(52) U.S. Cl. ...................... 455/550; 379/388; 379/390
(58) Field of Search .......................... 455/550; 379/389, 379/388

(56) References Cited

U.S. PATENT DOCUMENTS

| | | | |
|---|---|---|---|
| 4,246,443 A | * 1/1981 | Smith ......................... | 455/462 |
| 5,008,953 A | 4/1991 | Dahlin et al. .................. | 455/33 |
| 5,416,836 A | 5/1995 | Marinelli et al. ........... | 379/377 |
| 5,430,792 A | 7/1995 | Jesurum et al. ............... | 379/67 |
| 5,535,429 A | 7/1996 | Bergenlid et al. .......... | 455/53.1 |
| 5,581,596 A | 12/1996 | Hogan .......................... | 379/59 |
| 5,694,451 A | 12/1997 | Arinell ........................ | 379/34 |
| 5,787,165 A | * 7/1998 | Lilja et al. ................... | 379/390 |
| 6,055,309 A | * 4/2000 | Kim ............................. | 379/389 |

\* cited by examiner

*Primary Examiner*—Daniel Hunter
*Assistant Examiner*—Alan T. Gantt
(74) *Attorney, Agent, or Firm*—Dilworth & Barrese, LLP

(57) ABSTRACT

A mobile radio communication terminal automatically disconnects a call after completion of a telephone conversation. A speaker signal detector generates a first detection signal upon detection of an audio signal received from another party, and a microphone signal detector generates a second detection signal upon detection of an audio signal input from a microphone. A controller disconnects an established speech path when the first and second detection signals are not input from respective speaker signal detector and the microphone signal detector, for a predetermined time.

5 Claims, 3 Drawing Sheets

DEVICE AND METHOD FOR AUTOMATICALLY DISCONNECTING A CALL IN A MOBILE RADIO COMMUNICATION TERMINAL

BACKGROUND OF THE INVENTION

1. Field of the Invention

The present invention relates to mobile radio communication terminals, and in particular, to a device and method for automatically disconnecting a call after completion of a telephone conversation.

2. Description of the Related Art

In general, a mobile radio communication terminal, such as a cellular telephone, holds a speech path until a user inputs (or presses) a call end key, even though the other party's communication terminal ends the call.

FIG. 1 illustrates a block diagram of a common mobile radio communication terminal. Referring to FIG. 1, a controller 10, a one-chip microprocessor, controls the overall operations of the mobile radio communication terminal. A memory 20 permanently stores an operating program and temporarily stores data generated during execution of the operating program. A key input part 30, (i.e., a keypad), includes a plurality of numeric keys and a function key, and generates key data for the respective keys. A display 40 displays the key data input from the keypad 30, and the operating status of the mobile radio communication terminal in text and icons. An RF (Radio Frequency) part 50 converts an RF signal received via an antenna ANT to an IF (Intermediate Frequency) signal, and an IF signal to be transmitted to an RF signal. An audio part 60 demodulates an output signal of the RF part 50 to output an audio signal through a speaker SP, and modulates an audio signal input from a microphone MIC to send the modulated audio signal through the RF part 50 and the antenna ANT.

FIG. 3 is a flowchart illustrating a conventional method for disconnecting a call after completion of a telephone conversation in the mobile radio communication terminal of FIG. 1. Referring to FIG. 3, the controller 10 determines whether a speech path is formed in response to a SEND key input from the key input part 30 or an incoming call received through the antenna ANT (step 201). If the speech path is formed, the controller 10 proceeds to set the mobile radio communication terminal to a call state and transmits/receives an audio signal through the audio part 60 and the RF part 50 (step 203). In the meantime, controller 10 determines whether an END key (i.e., call end key) is input from the key input part 30 (step 205). If the END key is input, the controller 10 disconnects the speech path to terminate the call (step 207).

However, controller 10 continues to hold the call state of step 203 unless the user presses the END key, even though the other party ends the call. Therefore, the user is required to press the END key without fail in order to disconnect the speech path, which creates an additional distraction to the user, particularly when he drives.

SUMMARY OF THE INVENTION

It is therefore an object of the present invention to provide a device and method for automatically disconnecting a call after completion of a telephone conversation, even without pressing a call end key.

To achieve the above object, there is provided a device for automatically disconnecting a call after completion of a telephone conversation in a mobile radio communication terminal. A speaker signal detector generates a first detection signal upon detection of an audio signal received from an other party, and a microphone signal detector generates a second detection signal upon detection of an audio signal input from a microphone. A controller disconnects an established speech path when the first and second detection signals are not input from the speaker signal detector and the microphone signal detector, for a predetermined time.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF PREFERRED EMBODIMENTS

A preferred embodiment of the present invention will be described hereinbelow with reference to the accompanying drawings. In the following description, well known functions or constructions are not described in detail since they would obscure the invention in unnecessary detail.

Figure 1:
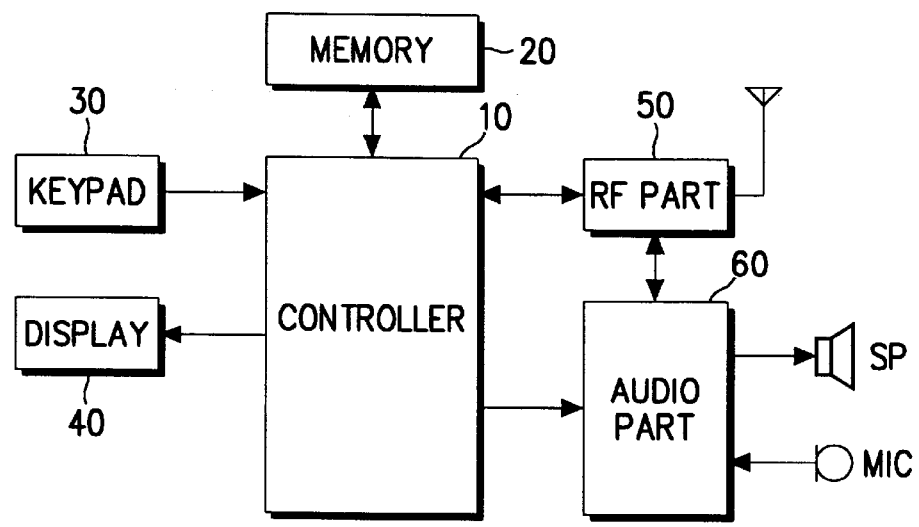
FIG. 1 is a block diagram of a common mobile radio communication terminal.
Figure 2:
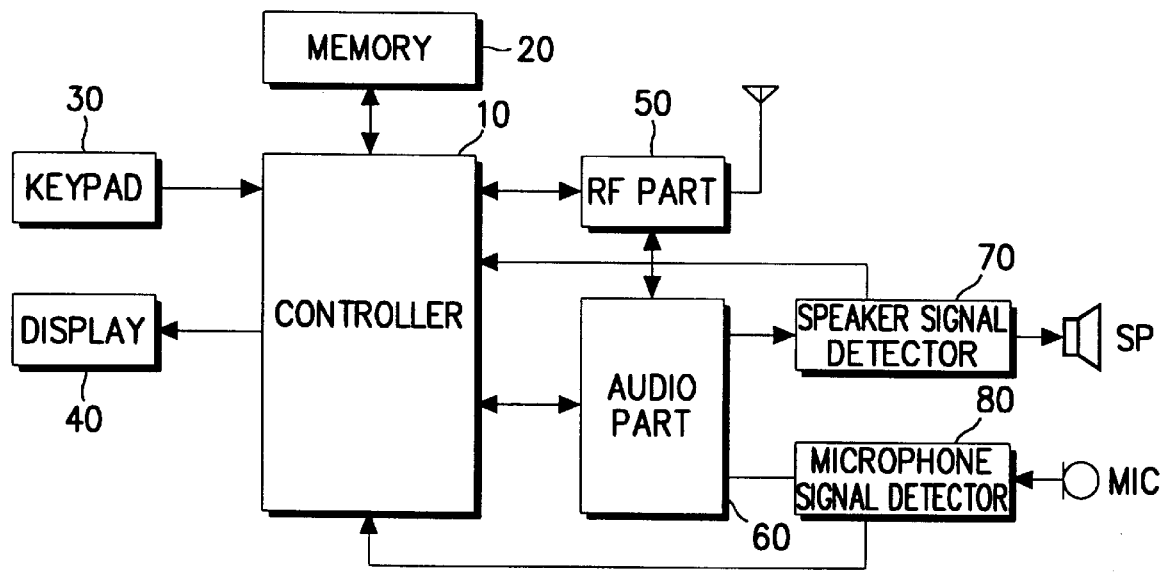
FIG. 2 is a block diagram of a mobile radio communication terminal according to an embodiment of the present invention.
Figure 3:
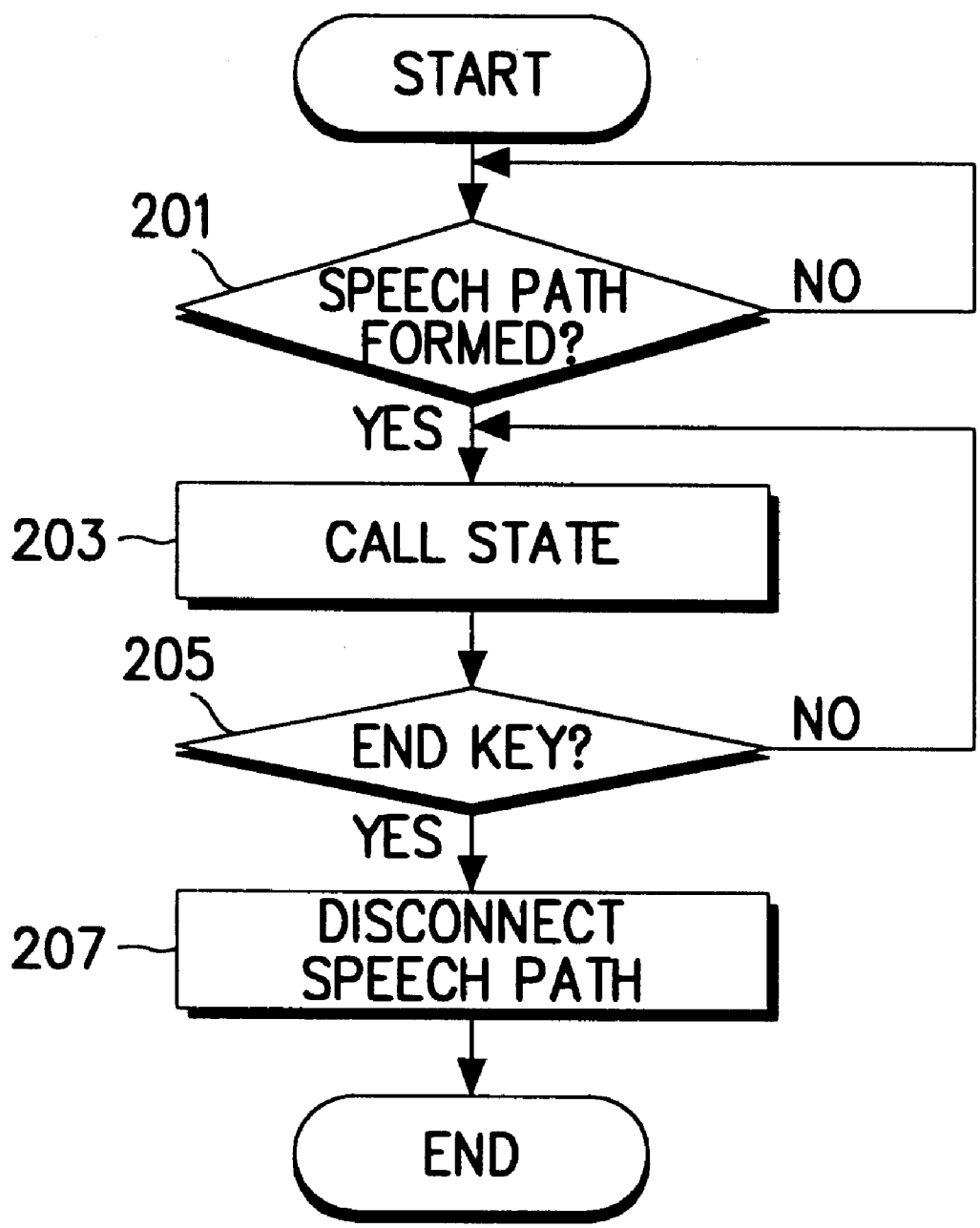
FIG. 3 is a flowchart illustrating a conventional method for disconnecting a call after completion of a telephone conversation in the common mobile radio communication terminal.

FIG. 2 illustrates a block diagram of a mobile radio communication terminal according to an embodiment of the present invention. Referring to FIG. 2, a controller 10, a one-chip microprocessor, controls the overall operations of the mobile ratio communication terminal. A memory 20 permanently stores an operating program and temporarily stores data generated during execution of the operating program. A key input part 30, (i.e., a keypad), includes a plurality of numeric keys and a function key, and generates key data for the keys. A display 40 displays the key data input from the keypad 30, and the operating status of the mobile radio communication terminal in text and icons. An RF (Radio Frequency) part 50 converts an RF signal received via an antenna ANT to an IF (Intermediate Frequency) signal, and an IF signal to be transmitted to an RF signal. An audio part 60 demodulates an output signal of the RF part 50 to output an audio signal through a speaker SP, and modulates an audio signal input from a microphone MIC to send the modulated audio signal through the RF part 50 and the antenna ANT. A speaker signal detector 70 generates a first detection signal upon detection of the audio signal output from the audio part 60 and provides the first detection signal to the controller 10. A microphone signal detector 80 generates a second detection signal upon detection of the audio signal input from the microphone MIC and provides the second detection signal to the controller 10.

Figure 4:
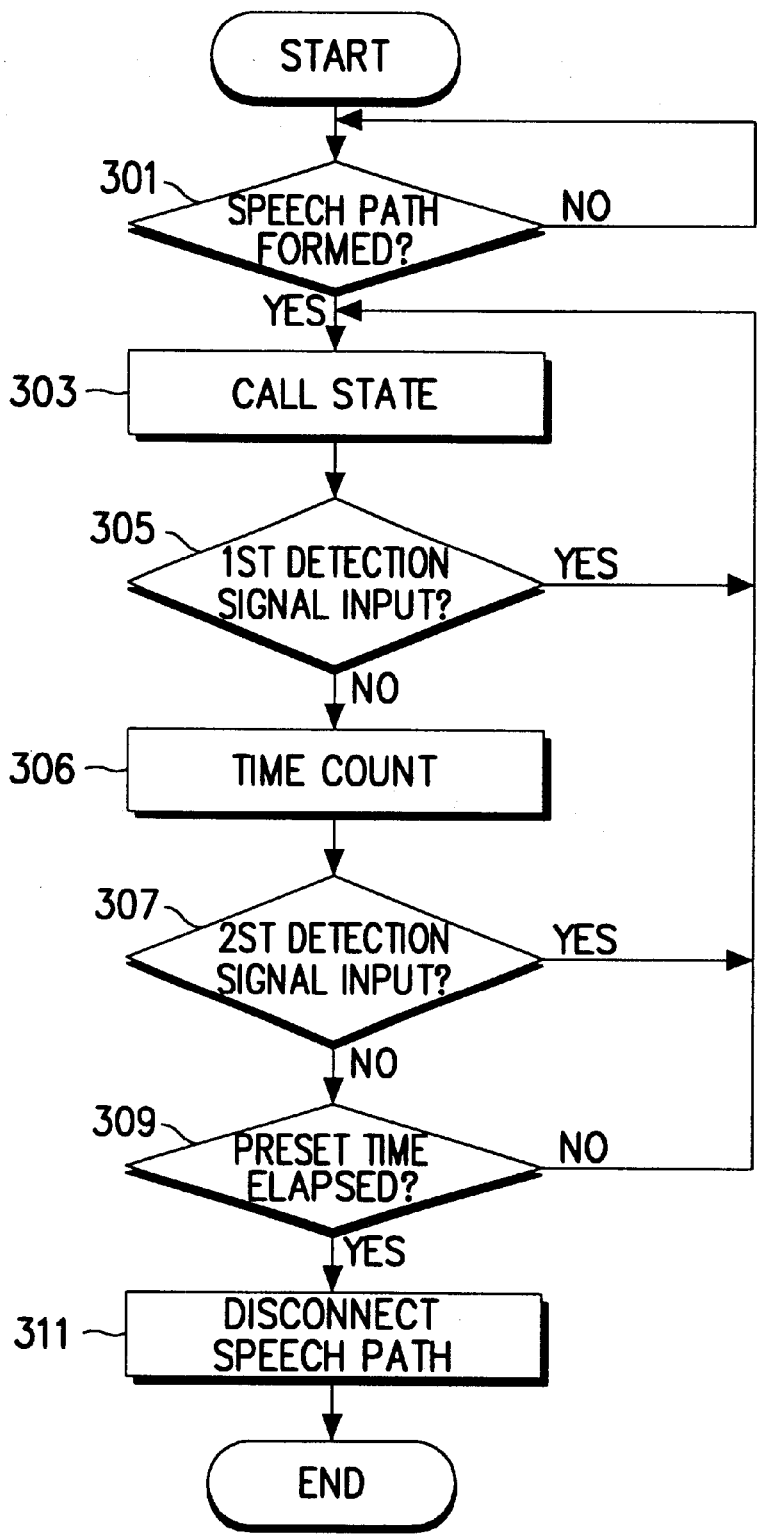
FIG. 4 is a flowchart illustrating a method for automatically disconnecting a call after completion of a telephone conversation in the mobile radio communication terminal according to the present invention.

FIG. 4 is a flowchart illustrating a method for automatically disconnecting a call after completion of a telephone conversation in the mobile radio communication terminal of FIG. 2. Referring to FIG. 4, controller 10 determines whether a speech path is formed in response to a SEND key input from the keypad 30 or a CALL key input from the keypad 30 in answer to an incoming call received through the antenna ANT (step 301). If the speech path is formed, controller 10 proceeds to set the mobile radio communication terminal to a call state and transmits/receives an audio signal through the audio part 60 and the RF part 50 (step 303). In the meantime, controller 10 determines whether the first detection signal is input from the speaker signal detector 70 (step 305). When the first detection signal is input, the controller 10 returns to step 303 to hold the call state. However, when the first detection signal is not input, the controller 10 starts an internal timer (not shown) to count a time (step 306). After starting the timer, the controller 10 proceeds to step 307 to determine whether the second detection signal is input from the microphone signal detector 80. When the second detection signal is input, controller 10 initializes the timer and then returns to step 303. However, when the second detection signal is not input, controller 10 proceeds to step 309 to determine whether the time counted by the timer exceeds a preset time. When the counted time exceeds the preset time, controller 10 disconnects the established speech path (step 311).

As described above, the novel mobile radio communication terminal automatically disconnects the call when the speaker signal and the microphone signal are not detected for a predetermined time, even without pressing the call end key.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for automatically disconnecting a call after completion of a telephone conversation in a mobile radio communication terminal, comprising:

a speaker signal detector for generating a first detection signal upon detection of an audio signal received from another party;

a microphone signal detector for generating a second detection signal upon detection of an audio signal input from a microphone;

a time counter for counting a time during which the first detection signal is detected for a first predetermined time and for counting a time during which the second detection is not detected for a second predetermined time; and a controller for disconnecting a speech path when both the first and second detection signals are not received for the first predetermined time.

2. A method for automatically disconnecting a call after completion of a telephone conversation in a mobile radio communication terminal having a speaker signal detector for generating a first detection signal upon detection of an audio signal received from another party and a microphone signal detector for generating a second detection signal upon detection of an audio signal input from a microphone, the method comprising the steps of:

determining whether or not the speaker signal detector detects the first detection signal for a first predetermined time during a call state;

determining whether or not the microphone signal detector detects the second detection signal from the microphone for a second predetermined time if the first detection signal is not detected for the first predetermined time;

determining whether or not a counted time exceeds the predetermined time, when the first and second detection signals are not input; and disconnecting the call when the counted time of the first and second detection signals exceeds the combination of the first and second predetermined time.

3. The method as claimed in claim 2, further comprising the step of maintaining the call state when either one of the first and second detection signals is input before the counted time exceeds the predetermined time.

4. A method for automatically disconnecting a call after completion of a telephone conversation in a mobile radio communication terminal comprising the steps of:

generating a first detection signal upon detection of an audio signal received from another party;

generating a second detection signal upon detection of an audio signal input from a microphone;

counting a predetermined time after detecting the first detection signal; and disconnecting the call when the second detection signal is not received for the predetermined period of time.

5. The method as claimed in claim 4, further comprising the step of maintaining the call when either of said first and second detection signals are received before the expiration of the predetermined time period.

* * * * *